United States Patent [19]
Drevet et al.

[11] Patent Number: 4,541,773
[45] Date of Patent: Sep. 17, 1985

[54] SAFETY DEVICE FOR MOTOR PUMP GROUP

[75] Inventors: Michel Drevet, Lyons, France; Jean Trouillet, Fontaine-Valmont, Belgium

[73] Assignee: Jeumont-Schneider Corporation, Cedex, France

[21] Appl. No.: 679,098

[22] Filed: Dec. 6, 1984

Related U.S. Application Data

[63] Continuation of Ser. No. 269,648, Jun. 2, 1981, abandoned.

[30] Foreign Application Priority Data

Jun. 2, 1980 [FR] France ................ 80 12179

[51] Int. Cl.⁴ ............... F01D 25/16; F04D 29/04
[52] U.S. Cl. .................... 415/111; 415/170 R; 416/174; 384/102; 384/144
[58] Field of Search ............ 415/9, 110, 111, 113, 415/170 B, 180, 112, 172 R, 174, 170 R; 308/1 A, 26; 384/102, 118, 144, 100, 114, 99; 416/174

[56] References Cited

U.S. PATENT DOCUMENTS

| 2,469,734 | 5/1949 | Ledwith | 384/144 |
| 2,796,027 | 6/1957 | Brown | 415/112 |
| 3,090,654 | 5/1963 | Wald et al. | 384/144 X |
| 3,203,354 | 8/1965 | Pedersen | 415/112 |
| 3,338,645 | 8/1967 | Pribnow | 384/121 |
| 3,454,309 | 7/1969 | Ingham et al. | 384/102 |
| 3,578,874 | 5/1971 | Sproule et al. | 415/201 X |
| 3,732,029 | 5/1973 | Raymond et al. | 415/111 |
| 3,927,890 | 12/1975 | Adams, Jr. | 415/111 X |

FOREIGN PATENT DOCUMENTS

| 534564 | 1/1955 | Belgium | 415/180 |
| 2210951 | 2/1973 | Fed. Rep. of Germany | 415/201 |
| 625426 | 6/1949 | United Kingdom | 384/102 |
| 1175465 | 12/1969 | United Kingdom | 384/114 |
| 0761720 | 9/1980 | U.S.S.R. | 415/170 B |

Primary Examiner—Robert E. Garrett
Assistant Examiner—H. Edward Li
Attorney, Agent, or Firm—Rines and Rines Shapiro and Shapiro

[57] ABSTRACT

This invention provides in centrifugal motor pumps and the like a safety structure embodying a bearing bushing coaxially mounted with respect to the pump shaft in a space between the shaft and the body of the pump, with the bushing designed to act as a hydrodynamic bearing in the case of decentering of the pump shaft or similar disfunction only.

3 Claims, 1 Drawing Figure

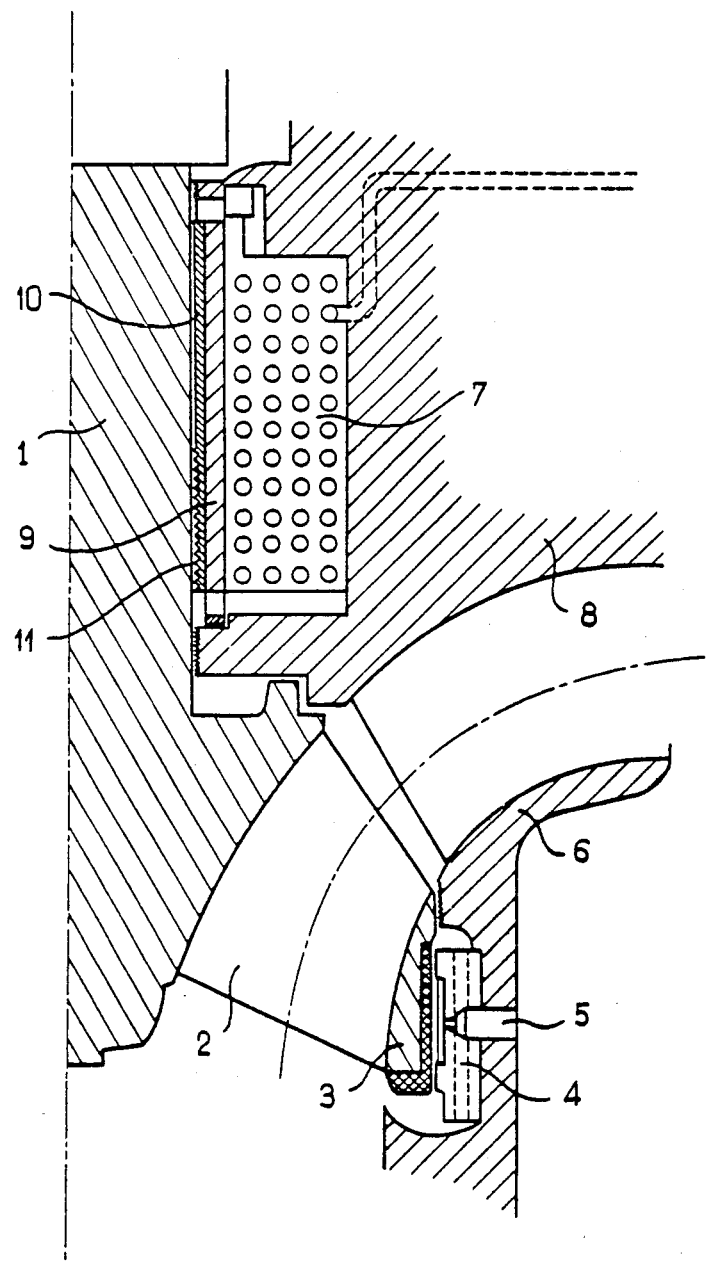

SAFETY DEVICE FOR MOTOR PUMP GROUP

This is a continuation application of Ser. No. 269,648, filed June 2, 1981, now abandoned.

The present invention concerns centrifugal motor pump groups for fluids under pressure of the type comprising a vane wheel attached to a vertical shaft driven in rotation and emplaced within the body of the pump, and, more particularly, a safety device permitting functioning of the pump in abnormal and accident conditions.

Generally, the vertical shaft of a motor pump group is guided by means of two hydrodynamic bearings on the two sides of the drive motor of the pump and one hydrostatic bearing against which the rim of the pump wheel is supported. This plurality of guide bearings is made necessary in order to increase the critical velocity of the shaft, i.e. its resonance frequency, by eliminating any residual overhang.

If the functioning of the hydrostatic bearing, which is normally supplied with the pressurized fluid circulating within the pump, is disturbed, for example following an untimely drop in pressure of the fluid entailing especially the appearance of an imbalance particularly in the diphasic region of the fluid, the supply of fluid to the bearing is reduced or reversed, and there results an instability which can result in a loss of centering of the shaft, which increases the risk of deterioration of parts in relative motion which then come into contact.

The present invention has as an object or goal to provide a novel safety device for such pump motors and the like that alleviates these disadvantages by means of an additional hydrodynamic bearing whose functioning is not required except in case of failure of the hydrostatic bearing; that is, during functioning under abnormal conditions.

Other and further objects will be explained hereinafter and are more particularly delineated in the appended claims.

According to the invention, this bearing is constituted by a bushing installed preferably coaxially to the shaft, in a space arranged for this purpose between the shaft and the body of the pump, the bushing having an inside diameter slightly greater than the diameter of the shaft so as not to act as a hydrodynamic bearing except in case of decentering of the pump shaft.

Preferably, a multiplicity of cavities are provided on a portion of the interior surface of this bushing, in order to form a labyrinth making it possible to limit the rate of escape of the fluid around the shaft.

In summary, from one of its aspects, the invention embraces safety device for motor pump group for fluid under pressure comprising a vane wheel integrally connected to a vertical shaft driven in rotation, and emplaced in a pump body, the rim of the said wheel normally being outwardly supported i.e., guided by a hydrostatic bearing characterized in that the same comprises a bushing placed coaxially to the said shaft in a space provided for this purpose between the said shaft and the inner wall of the said body, the said bushing having an inside diameter slightly greater than the diameter of the said shaft so as to constitute with the said wall a hydrodynamic bearing for guiding the shaft in case of failure of the said hydrostatic bearing.

The invention will be better understood and other advantages and characteristics of it will become more clear through the following description of a preferred mode of realization, in connection with the appended drawing.

The sole FIGURE represents, in partial axial cutaway or transverse section, a pump provided with an additional hydrodynamic bearing conforming to the invention.

Referring to the single FIGURE, in which the drive motor of the vertical shaft 1 of the pump has not been represented, a vane wheel 2 is fastened solidly to the shaft 1. The rim 3 of this wheel is guided by a hydrostatic bearing 4 supplied with fluid pumped by means of a nozzle 5 integral with the diffuser 6 of the pump.

For certain applications of such a pump, a portion of the pumped fluid is directed to a refrigeration apparatus 7 placed in the body 8 of the pump so as to secure the supply of fluid to a controlled leakage joint not represented in the FIGURE. In this case, the wall 9 of the pump body 8 constitutes a thermal barrier.

According to the present invention, a bushing 10 is placed coaxially to the shaft 1, in a space provided for this purpose between this shaft 1 and the body of the pump; or, more precisely, between this shaft 1 and the wall 9 of the body 8 of the pump.

This bushing 10 is intended to act as a hydrodynamic bearing for guiding the shaft in the event of failure of the hydrostatic bearing 4. For this reason, the inside diameter of the bushing 10, which is slightly greater than the diameter of the shaft 1, is such that the rim 3 of the wheel cannot come into contact with the bushing of the bearing 4.

The result is that in normal operation of the pump the bearing constituted by the bushing 10 is not used so as not to alter noticeably the dynamic characteristics of the shaft 1, and so as not to cause wear of the parts.

However, in abnormal functioning, for example due to a loss of pressure of the fluid, the hydrostatic bearing 4 becomes unstable, and the bushing 10 then acts as a hydrodynamic bearing to guide the shaft reducing any overhang and decreasing the level of vibration of the shaft, in other words keeping its critical velocity at a level clearly greater than its running speed. Since any contact between the rim 3 of the wheel and the hydrostatic bearing 4 is prevented, deterioration of the bearing is averted.

A bushing of this kind is realized preferably by applying a lining, for example of carbon, to the inner surface of the wall 9 of the pump body 8, with the facing surface of the shaft generally receiving a different coating.

In favorable fashion, in the portion 11 of the bushing 10 are provided a number of cavities so as to form a labyrinth making it possible to limit the flow of the fluid circulating between the bushing 10 and the shaft 1.

According to an example of realization, with a pump for which the critical velocity of the shaft is greater than 2500 revolutions per minute and the length of the shaft between the drive motor and the wheel is equal to about 3 meters, with the wheel having a radius of about 80 cm, a bushing with a length of about 30 cm has proven sufficient to furnish the advantages described, with the free play provided between the shaft 1 and the bushing 10 being equal to about 0.4 mm; in other words being practically three times greater than the amplitude of the vibrations, i.e., the amount of perpendicular movement of the shaft with respect to its axis, engendered in normal operation by the rotation of the shaft 1 of the pump.

The bushing 10 may be placed in another location, notably above the thermal barrier. Nevertheless, by placing it against the wall 9 of the refrigeration apparatus 7, its cooling is ensured at all times, and in particular when it serves as a hydrodynamic bearing.

Although only one preferred mode or realization of the invention has been described, it is apparent that other modifications will occur to those skilled in the field, and such are considered to fall within the spirit and framework of the present invention, as defined in the appended claims.

We claim:

1. Safety device for a motor-pump assembly for pumping fluid under pressure comprising a vane wheel integrally connected to a vertical shaft driven in rotation, and emplaced in a pump body, the rim of said wheel normally being horizontally guided by a hydrostatic bearing, characterized in that the safety device comprises a bushing disposed coaxially around said vertical shaft, and means supporting said bushing on an inner wall of said pump body and providing a space horizontally between the interior of said bushing and the exterior of said shaft for flow of fluid therebetween and for causing said shaft and said bushing with fluid therebetween to constitute an inoperative hydrodynamic bearing when said shaft is normally guided by said hydrostatic bearing and to constitute an operative hydrodynamic bearing, that prevents contact of said vane wheel and said hydrostatic bearing, solely by reduction of said space when said hydrostatic bearing fails and permits said shaft to move horizontally toward said bushing, said bushing having labyrinth seal means including a plurality of cavities for limiting the flow of fluid in said space, whereby the dynamic characteristics of said shaft are substantially unaffected by the presence of said hydrodynamic bearing when said hydrostatic bearing is operative and whereby damage to said motor-pump assembly upon failure of said hydrostatic bearing is prevented by operation of said hydrodynamic bearing.

2. Safety device according to claim 1, and in which the said bushing comprises a carbon lining placed on the inner wall of the said body.

3. Safety device according to claim 1, wherein vibrations of the shaft during normal rotation thereof produce movement of the shaft perpendicular to its axis, and wherein the difference between the inside diameter of the said bushing and the diameter of the shaft is substantially three times the amount of such perpendicular movement of the shaft during the normal rotation of the shaft.

* * * * *